US011105291B1

(12) United States Patent
Van Nieuwstadt

(10) Patent No.: US 11,105,291 B1
(45) Date of Patent: Aug. 31, 2021

(54) METHODS AND SYSTEMS FOR UNSTICKING ENGINE POPPET VALVES

(71) Applicant: Ford Global Technologies, LLC, Dearborn, MI (US)

(72) Inventor: Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/035,273

(22) Filed: Sep. 28, 2020

(51) Int. Cl.
| F01L 9/40 | (2021.01) |
| F02D 41/22 | (2006.01) |
| F02D 41/00 | (2006.01) |
| F02P 5/145 | (2006.01) |
| F02D 13/02 | (2006.01) |
| F02B 37/24 | (2006.01) |
| F02D 41/40 | (2006.01) |

(52) U.S. Cl.
CPC .............. *F02D 41/22* (2013.01); *F02B 37/24* (2013.01); *F02D 13/0215* (2013.01); *F02D 41/0007* (2013.01); *F02D 41/0077* (2013.01); *F02D 41/401* (2013.01); *F02P 5/145* (2013.01); *F01L 2009/4088* (2021.01); *F01L 2009/4096* (2021.01); *F02D 2041/001* (2013.01)

(58) Field of Classification Search
CPC .... F02D 41/22; F02D 13/0215; F02D 41/007; F02D 2041/001; F01L 2009/4088; F01L 2009/4096
See application file for complete search history.

(56) References Cited

U.S. PATENT DOCUMENTS

| 5,832,955 | A  | * | 11/1998 | Schrey | ...................... F01L 9/20 |
| | | | | | 137/551 |
| 6,425,355 | B1 | * | 7/2002 | Van Der Staay | ...... G01M 15/11 |
| | | | | | 123/90.11 |
| 6,840,213 | B2 | | 1/2005 | Takahashi et al. | |
| 6,990,937 | B2 | | 1/2006 | Shindou et al. | |
| 7,869,929 | B2 | | 1/2011 | Sughiara | |
| 8,276,556 | B2 | | 10/2012 | Knauf et al. | |
| 2002/0112682 | A1 | * | 8/2002 | Koch | ........................ F01L 9/20 |
| | | | | | 123/90.11 |
| 2004/0020467 | A1 | * | 2/2004 | Leman | .................. F02M 57/025 |
| | | | | | 123/467 |
| 2007/0227497 | A1 | | 10/2007 | Roth | |
| 2014/0214304 | A1 | * | 7/2014 | Mischler | .............. F02D 41/2441 |
| | | | | | 701/102 |
| 2017/0218798 | A1 | * | 8/2017 | Matheis | ................... F02B 33/04 |
| 2019/0120101 | A1 | * | 4/2019 | Dadam | ................... F01N 11/00 |
| 2019/0249618 | A1 | * | 8/2019 | Dudar | ................. F01L 13/0005 |
| 2019/0353558 | A1 | * | 11/2019 | Chesney | ............. F02D 13/0261 |
| 2020/0149437 | A1 | | 5/2020 | Shelby | |
| 2020/0309051 | A1 | * | 10/2020 | Kelly | .................. F02D 41/0087 |
| 2020/0408167 | A1 | * | 12/2020 | Johnson | ................ F02F 7/0043 |

* cited by examiner

*Primary Examiner* — Thomas N Moulis
(74) *Attorney, Agent, or Firm* — Geoffrey Brumbaugh; McCoy Russell LLP

(57) ABSTRACT

Systems and methods for unsticking intake and exhaust valves of an engine are described. In one example, valves that may be adjustably timed relative to an engine crankshaft position may be adjusted to unstick intake and/or exhaust valve that are stuck open or closed. In addition, fuel injection timing and spark timing may be adjusted in an effort to unstick intake and/or exhaust valves.

20 Claims, 9 Drawing Sheets

METHODS AND SYSTEMS FOR UNSTICKING ENGINE POPPET VALVES

FIELD

The present description relates to a system and methods for unsticking poppet valves of engine cylinders during engine operation. The system and methods may allow poppet valves to resume movement after sticking in an open or closed position.

BACKGROUND AND SUMMARY

An engine cylinder may include intake and exhaust poppet valves to control flow through the cylinder. The intake and exhaust valves may be closed via valve springs and the intake and exhaust valves may be opened via force applied by a camshaft. Alternatively, the intake and/or exhaust valves may be opened via an electrical actuator to overcome spring forces. Surfaces of the intake and exhaust valves, including valve stems and valve sealing surfaces, may become exposed to unburnt hydrocarbons and carbonaceous soot that may cause the intake and/or exhaust valves to stick in an open or closed position. Valves that stick in an open or closed position may cause loss of engine power, misfired, backfires, and other less than desirable operating conditions. Therefore, it may be desirable to provide a way to unstick valves that have been stuck in an open or closed state.

The inventor herein has recognized the above-mentioned issues and has developed an engine operating method, comprising: fully closing one or more valves of a cylinder of an engine within a predetermined crankshaft angle of a piston of the cylinder being at a top-dead-center (TDC) compression stroke position such that all valves of the cylinder are closed in response to one or more exhaust valves of the cylinder being stuck closed; and commanding the one or more exhaust valves of the cylinder that are stuck closed to open when the piston is within a predetermined crankshaft angle of the TDC compression stroke position.

By closing cylinder valves near a TDC position of a piston, it may be possible to provide the technical result of unsticking one or more exhaust valves that are stuck in a fully closed position. Specifically, closing the cylinder's valves near TDC may allow a higher level of vacuum to be generated within a cylinder so that a pressure differential across the stuck exhaust valve may help to open the stuck exhaust valves. In addition, pressure in the engine's exhaust manifold may be increased to further increase the pressure differential across the exhaust valve, thereby improving the possibility of opening the stuck exhaust valve.

The present description may provide several advantages. For example, the approach may unstick intake and/or exhaust valves without having to service a vehicle's engine. In addition, the approach may be applied to gasoline and diesel engines. Further, the approach provides procedures that are targeted to unstick exhaust valves and procedures that are targeted to unstick intake valves.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 3:
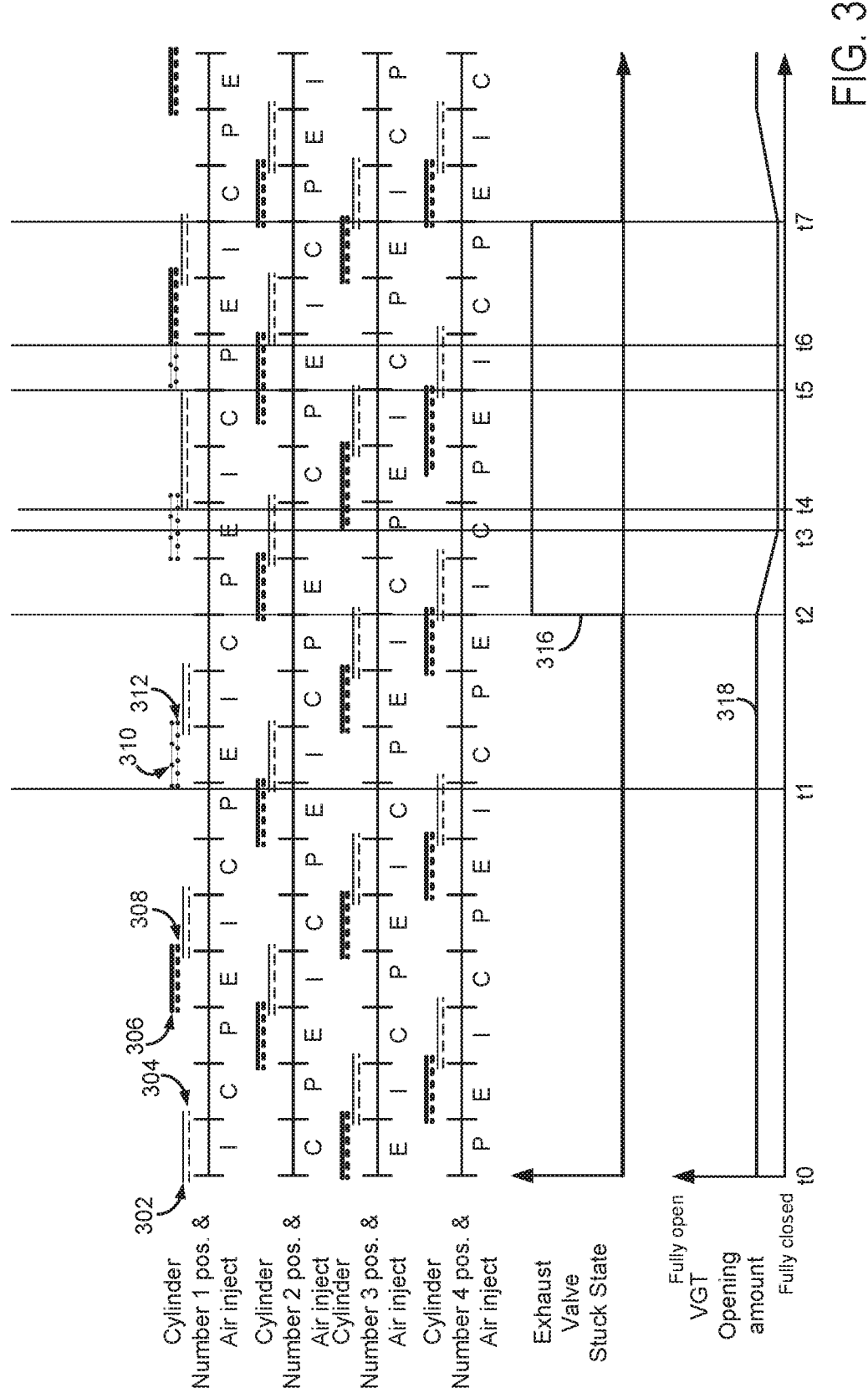
FIGS. 3 and 4 show example sequences for unsticking exhaust valves and intake valves.
Figure 4:
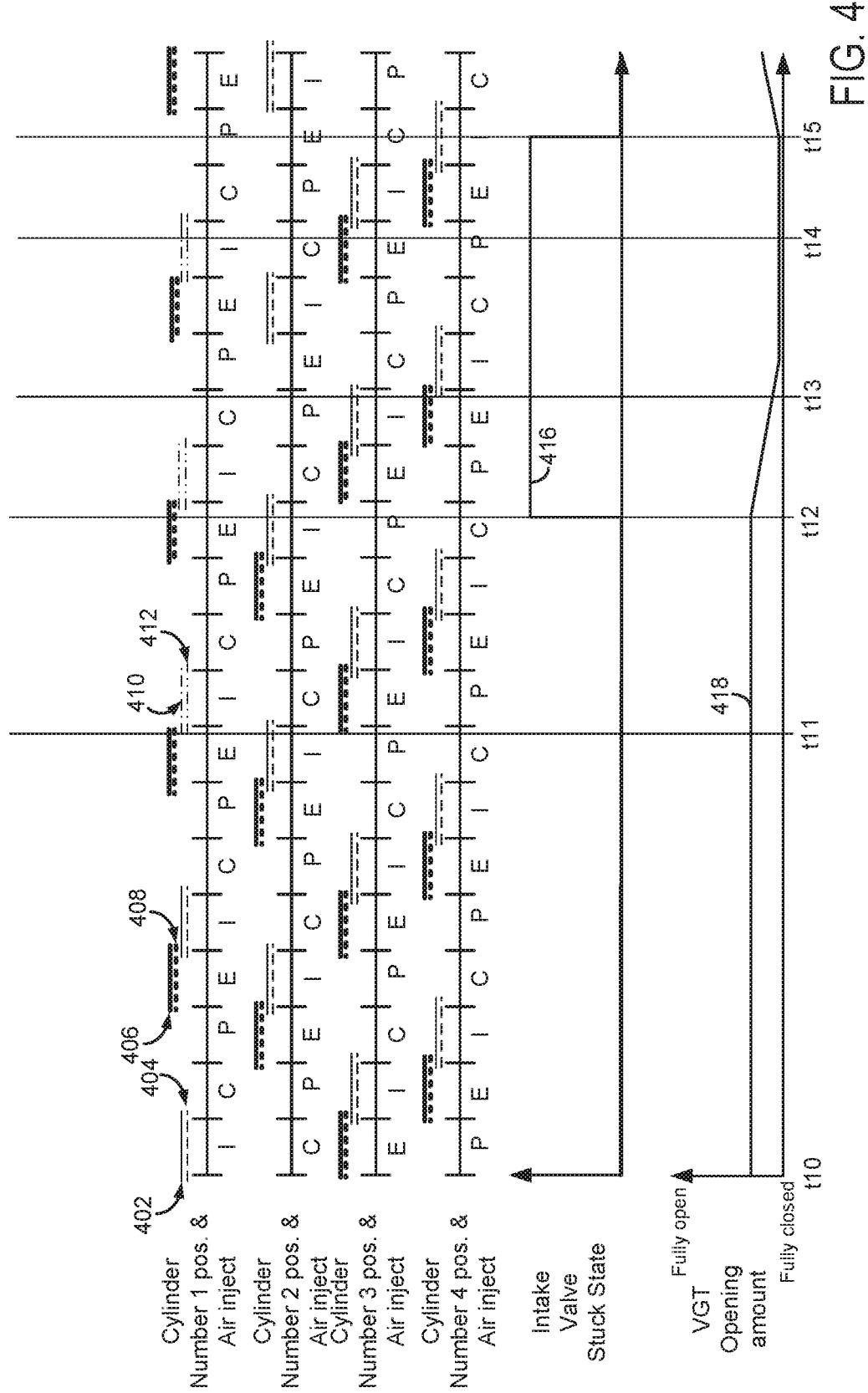
Figure 5:
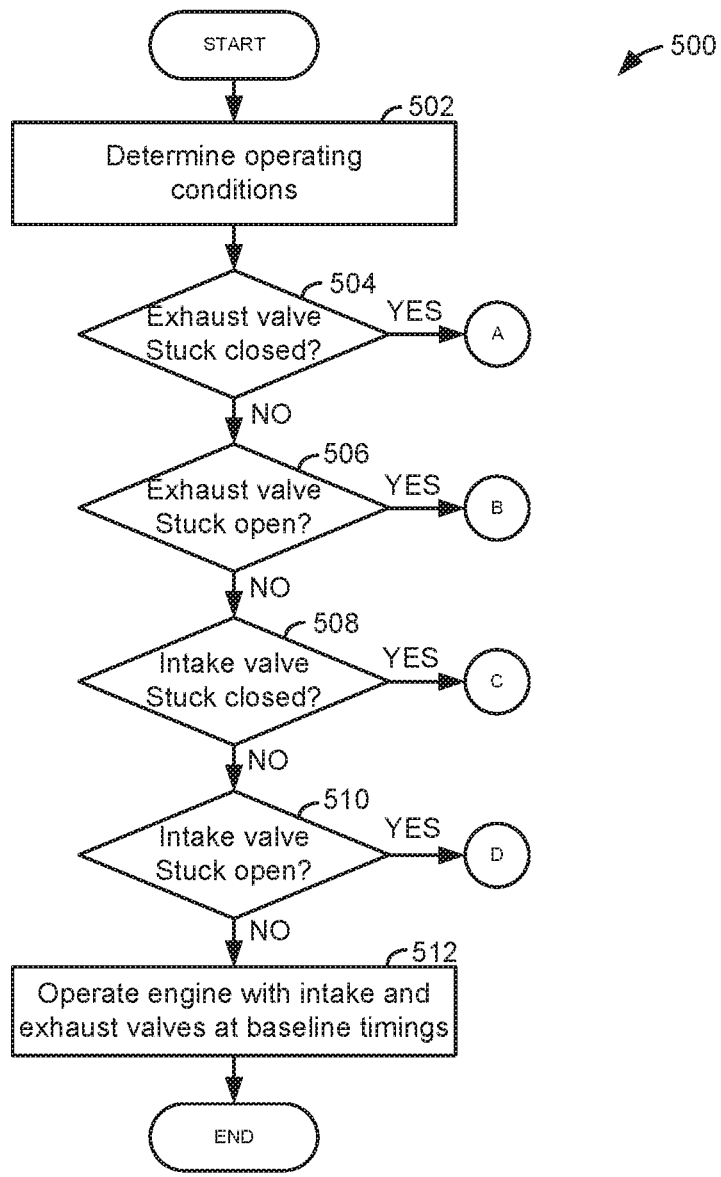
FIGS. 5-9 show an example method for unsticking intake and exhaust poppet valves of an internal combustion engine.
Figure 6:
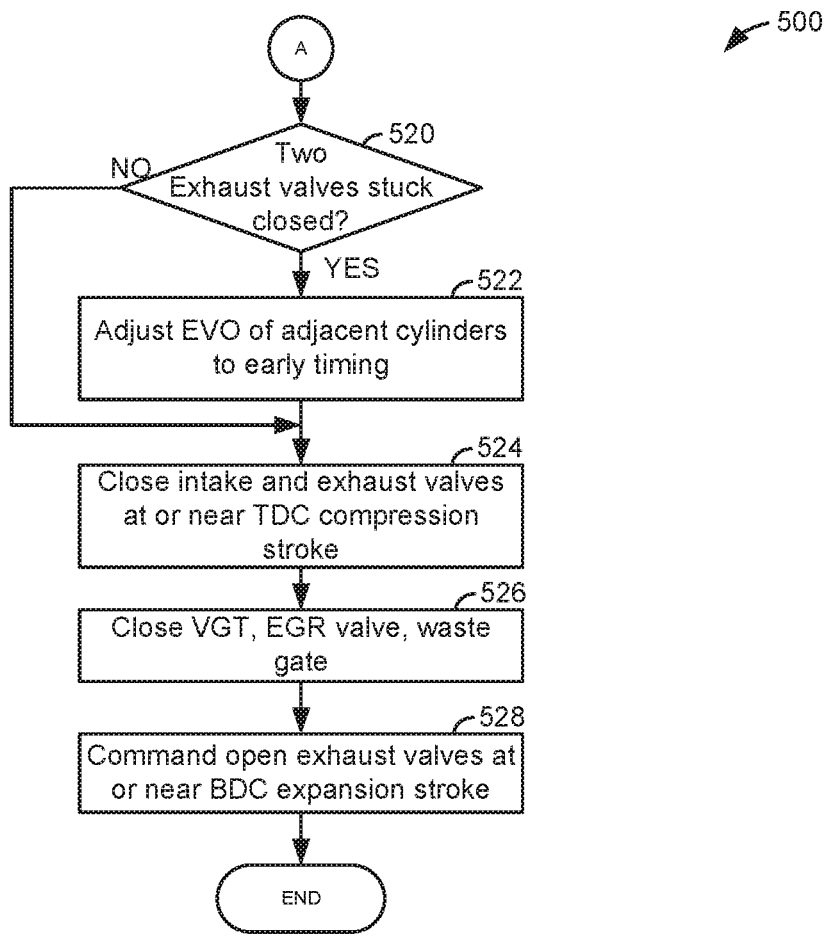
Figure 7:
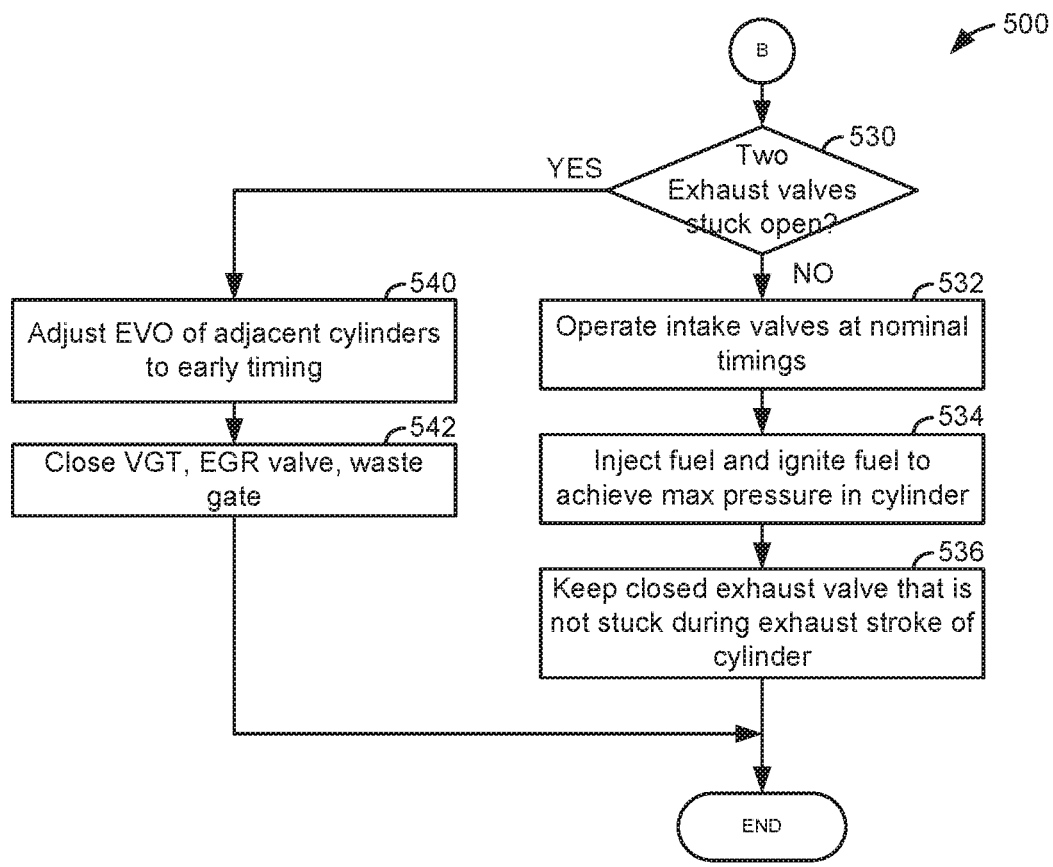
Figure 8:
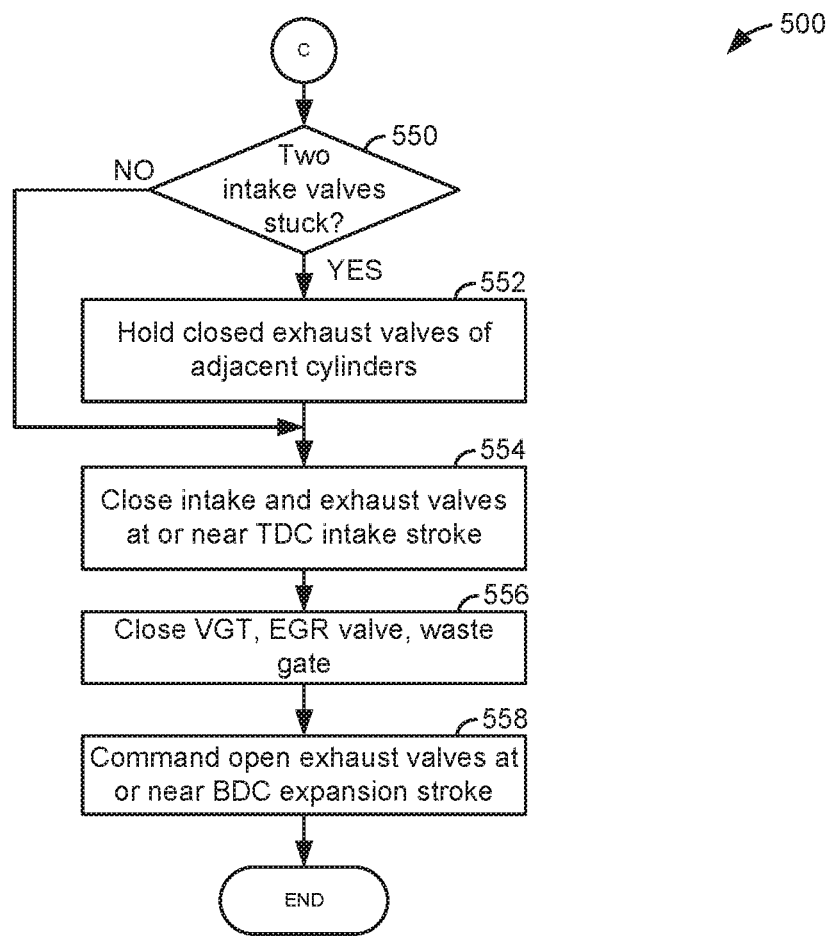
Figure 9:
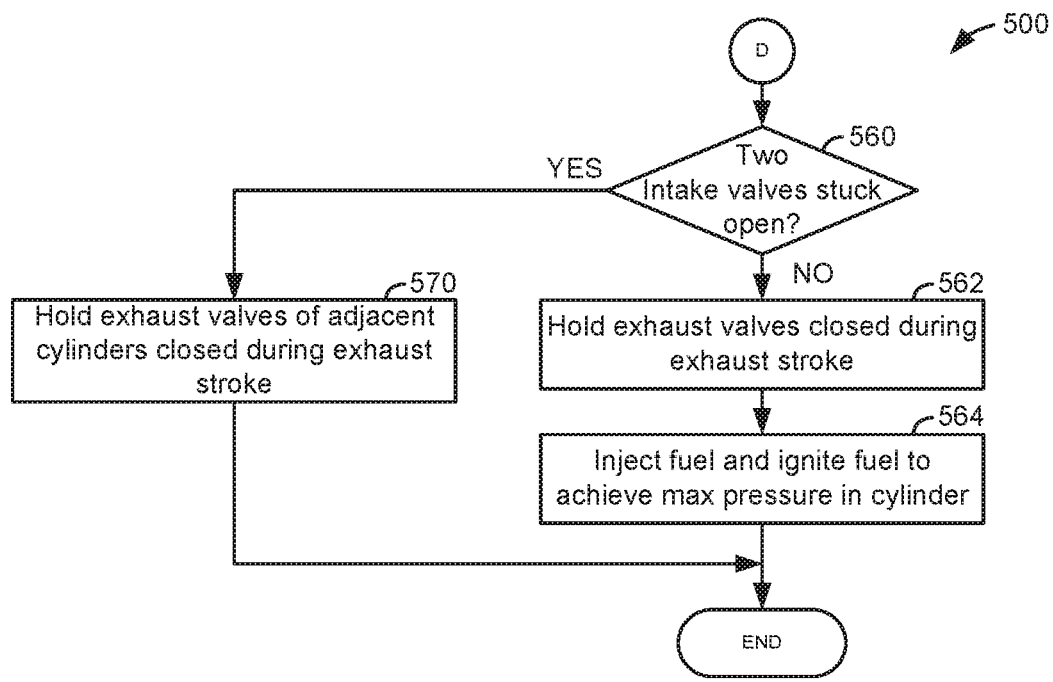

The present description is related to unsticking intake and exhaust poppet valves of an internal combustion engine. The methods may be applied to gasoline and diesel engines. In one example, the engine may be of the type shown in FIG. 1. Alternatively, the engine may be a diesel engine. The engine may include variable valve lift and variable valve timing. The engine may be configured as shown in FIG. 2, or in other configurations. A procedure for unsticking an exhaust valve that is stuck in a closed position is shown in FIG. 3. A procedure for unsticking an intake valve that is stuck in an open position is shown in FIG. 4. A method for unsticking exhaust and intake valves is shown in FIGS. 5-9.

Figure 1:
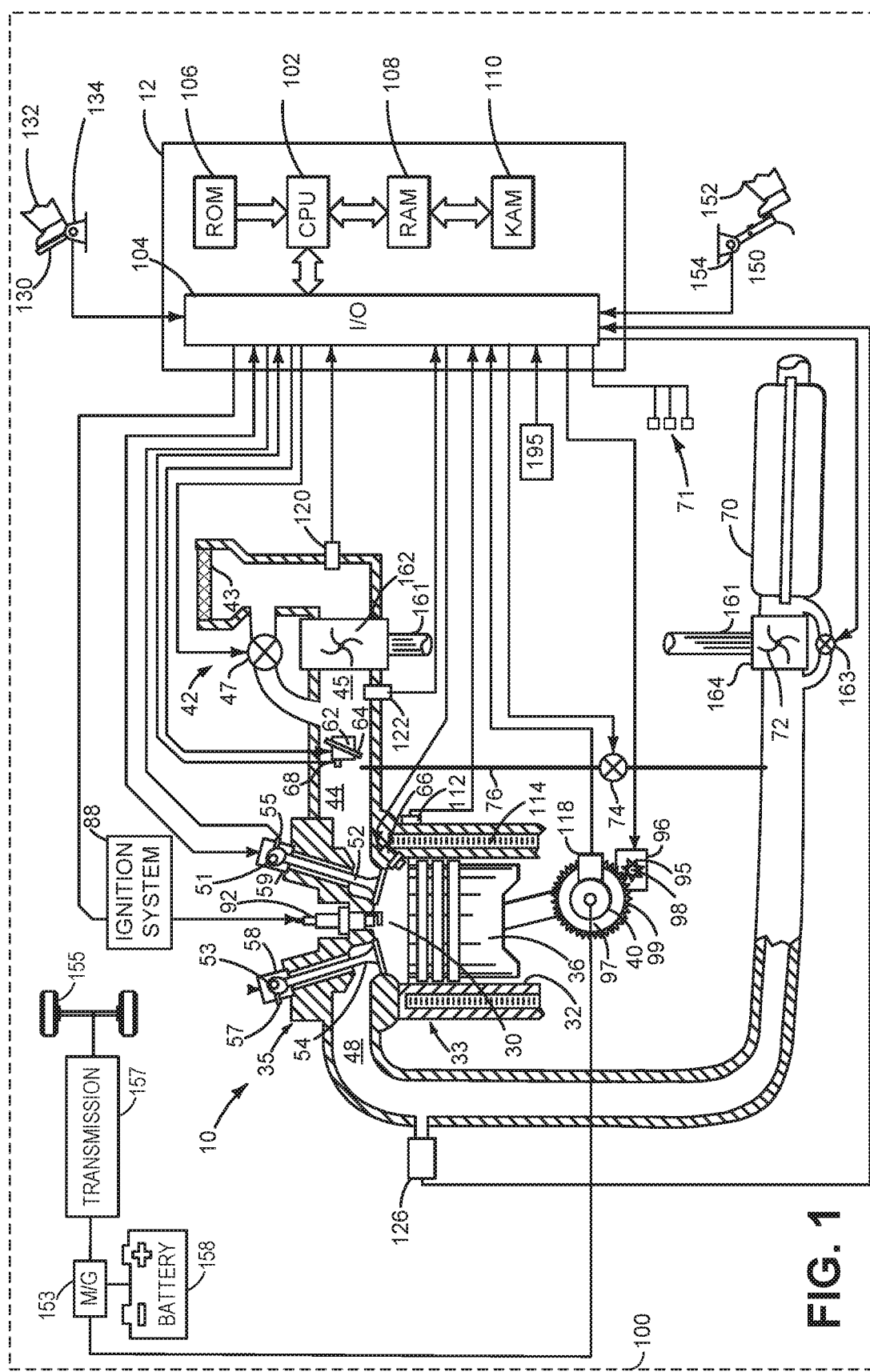
FIG. 1 is a schematic diagram of an engine.

Referring to FIG. 1, an internal combustion engine 10 is shown. Engine 10 may be included in a drivetrain of a vehicle 100 configured for on-road propulsion. In one example, vehicle 100 is a hybrid electric vehicle. However, vehicle 100 may be an electric vehicle or a conventional vehicle that includes only an internal combustion engine as a source of propulsive effort.

Engine 10 comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. An optional starter 96 (e.g., low voltage (operated with less than 30 volts) electric machine) is included for cranking the engine during an engine start. The starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain to initiate engine rotation during an engine start. Once a threshold engine speed is reached, the starter may be decoupled from the engine and thereafter engine rotation is maintained via fuel combustion in engine cylinders. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59 such that timing and lift of intake valve 52 may be adjusted. Exhaust valve 54 may be selectively activated and deactivated by valve activation device 58 such that timing and lift of exhaust valve 54 may be adjusted. Valve activation devices 58 and 59 may be electromechanical devices. The variable valve timing and lift actuators may be of the type described in U.S. Pat. Nos. 7,869,929; 8,276,556; 7,640,899, or U.S. Patent Application Number 2020/0149437, which are hereby fully incorporated in their entirety for all purposes, or other known valve actuators.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In further embodiments, fuel may be delivered into an intake port of cylinder 30, upstream of intake valve 52, to provide port injection of fuel. In still further embodiments, a portion of cylinder fuel may be delivered via direct injection while a remaining portion is delivered via port injection. The different injectors may deliver the same fuel or fuel of different properties, such as a gasoline fuel and an ethanol fuel.

Intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve (CRV) 47 may be selectively adjusted to a plurality of positions between fully open and fully closed. Adjusting the opening of CRV 47 allows boosted intake air to be selectively recirculated to upstream of the compressor so as to decrease the pressure in boost chamber 45. Waste gate 163 or variable geometry vanes 72 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Exhaust gas may be recirculated from exhaust manifold 48 to intake manifold 44 via exhaust gas recirculation (EGR) valve 74 and EGR passage 76. Flow through EGR passage 76 may be adjusted via adjusting a position of EGR valve 74.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an propulsive effort pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. The propulsive effort pedal and brake pedal may be combined for example in a pivoting setup to select either increasing vehicle speed or decreasing vehicle speed. Further, the propulsive effort pedal may be combined with the transmission direction selection for example, joystick control. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input data from additional sensors 71. Additional sensors 71 may include but are not limited to intake and exhaust poppet valve position sensors, intake $O_2$ sensors, intake manifold and exhaust manifold pressure sensors, barometric pressure sensors, humidity sensors, etc.

The controller 12 receives signals from the various sensors of FIG. 1 and employs the various actuators of FIG. 1, such as throttle 62, fuel injector 66, spark plug 91, etc., to adjust engine operation based on the received signals and instructions stored on a memory of the controller. As one example, the controller may send a pulse width signal to the fuel injector to adjust an amount of fuel delivered to a cylinder. Further, controller 12 may receive input from a human operator or vehicle passenger via human/machine interface 195. Human/machine interface may be a touch screen, touch panel, key switch, or other known input device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In some examples, vehicle 100 may be a hybrid vehicle with multiple sources of torque available to one or more vehicle wheels 155. In other examples, vehicle 100 is a conventional vehicle with only an internal combustion engine, or an electric vehicle with only electric machine(s). In the example shown, vehicle 100 includes engine 10 and an electric machine 153. Electric machine 153 may be a motor or a motor/generator. Crankshaft 40 of engine 10 and electric machine 153 are connected via a transmission 157 to vehicle wheels 155. In the depicted example, a first clutch 156 is provided between crankshaft 40 and electric machine 153. Electric machine 153 is shown directly coupled to transmission 157. Controller 12 may send a signal to an actuator of each clutch 156 to engage or disengage the clutch, so as to connect or disconnect crankshaft 40 from electric machine 153 and the components connected thereto, and/or connect or disconnect electric machine 153 from transmission 157 and the components connected thereto. In other examples, clutches need not be included. Transmission 157 may be a gearbox, a planetary gear system, or another type of transmission. The powertrain may be configured in various manners including as a parallel, a series, or a series-parallel hybrid vehicle.

Electric machine 153 receives electrical power from a traction battery 158 to provide torque to vehicle wheels 155. Electric machine 153 may also be operated as a generator to provide electrical power to charge battery 158, for example during a braking operation.

The system of FIG. 1 provides for a vehicle system, comprising: an engine including adjustable timing intake and exhaust valves; and a controller including executable instructions stored in non-transitory memory that cause the controller to hold a first exhaust valve of a cylinder closed during an exhaust stroke of the cylinder in response to a second exhaust valve of the cylinder being stuck in an open position. The system further comprises additional instructions to advance fuel injection timing of the cylinder in response to the second exhaust valve of the cylinder being stuck in the open position. The system further comprises additional instructions to advance spark timing of the cylinder in response to the second exhaust valve of the cylinder being stuck in the open position. The system further comprises additional instructions to richen an air-fuel ratio of the cylinder in response to the second exhaust valve of the cylinder being stuck in the open position. The system further comprises additional instructions to advance exhaust valve opening timing of one or more cylinders of the engine in response to two exhaust valves of the cylinder being stuck open. The system further comprises additional instructions to close vanes of a turbocharger in response to the second exhaust valve of the cylinder being stuck in the open position. The system further comprises additional instructions to close a waste gate of the turbocharger in response to the second exhaust valve of the cylinder being stuck in the open position.

Figure 2A:
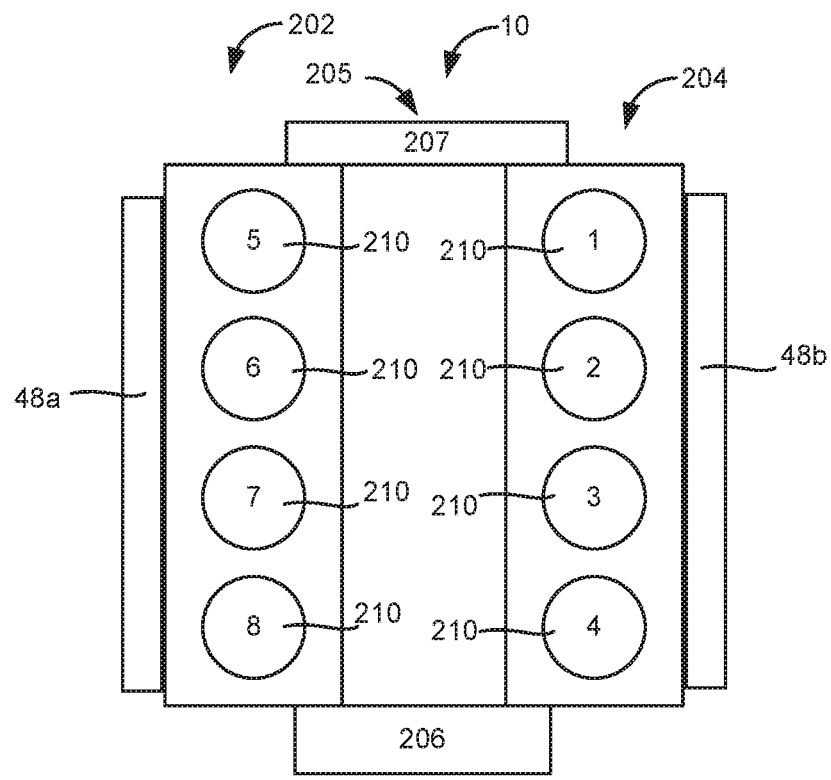
FIGS. 2A and 2B show example engine configurations.

Referring now to FIG. 2A, a first configuration of engine 10 is shown. Engine 10 includes two cylinder banks 202 and 204. First cylinder bank 204 includes cylinders 210 numbered 1-4. Second cylinder bank 202 includes cylinders 210 numbered 5-8. Thus, the first configuration is a V8 engine comprising two cylinder banks. Front 205 of engine 10 may include an accessory drive 207, which may include pumps, fans, etc. Transmission 206 is shown coupled to a rear side of engine 10.

Cylinders 210 may be organized into two or more groups and the groups may be based on cylinder firing order. For example, cylinders 1, 4, 6, and 7 may be organized into a first group of cylinders and cylinders 2, 3, 5, and 8 may be grouped into a second group of cylinders. Cylinders in the groups may be operated rich, lean, or with stoichiometric air-fuel ratios. In addition, cylinders of one group may be operated with lean air-fuel ratios while cylinders in a second group may be operated with rich air-fuel mixtures to increase a temperature of an after treatment device. Exhaust from cylinders 1-4 is directed to exhaust manifold 48b, which is common to cylinders 1-4. Exhaust from cylinders 5-8 is directed to exhaust manifold 48a, which is common to cylinders 5-8. Cylinder numbers three and one are adjacent to cylinder number two and so on.

Figure 2B:
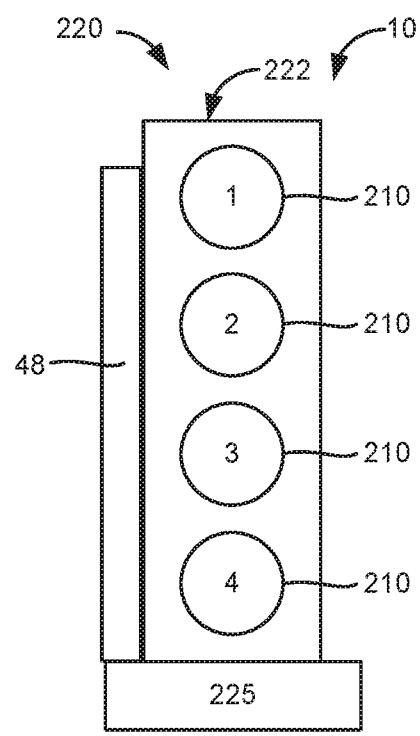

Referring now to FIG. 2B, a second configuration of engine 10 is shown. Engine 10 includes one cylinder bank 222. Cylinder bank 206 includes cylinders 210 numbered 1-4. Thus, the first configuration is an I4 engine comprising one cylinder bank. All cylinders operating may be a first cylinder operating mode for this engine configuration.

Cylinders 210 may be organized into two or more groups and the groups may be based on cylinder firing order. For example, cylinders 1 and 4 may be organized into a first group of cylinders and cylinders 2 and 3 may be grouped into a second group of cylinders. Cylinders in the groups may be operated rich, lean, or with stoichiometric air-fuel ratios. In addition, cylinders of one group may be operated with lean air-fuel ratios while cylinders in a second group may be operated with rich air-fuel mixtures to increase a temperature of an after treatment device. Exhaust from cylinders 1-4 is directed to exhaust manifold 48, which is common to cylinders 1-4.

Referring now to FIG. 3, a plot showing a prophetic sequence or procedure for freeing an exhaust poppet valve that is stuck in a fully closed position is shown. The sequence may be provided via the system of FIG. 1 in cooperation with the method of FIGS. 5-9. The vertical lines at times t0-t7 represent times of interest in the sequence. This sequence is for a four cylinder four stroke engine as shown in FIG. 2B.

The first plot from the top of FIG. 3 is a plot of intake and exhaust valve opening and closing events for cylinder number one relative to engine position. The horizontal axis is broken into sections that are labeled "I" for intake stroke, "C" for compression stroke, "P" for power or expansion stroke, and "E" for exhaust stroke. The vertical bars along the horizontal axis represent TDC piston positions and bottom-dead-center piston positions.

Intake valve open times for a first intake valve of a cylinder are indicated by thin solid line 302. Intake valve open times for a second intake valve of the cylinder are indicated by dashed thin line 304. Exhaust valve open times for a first exhaust valve of a cylinder are indicated by thick solid line 306. Exhaust valve open times for a second exhaust valve of the cylinder are indicated by dashed thick line 308. Engine crankshaft angles where the first exhaust valve is commanded open, but where the first exhaust valve is stuck closed is indicated by dotted line 310. Engine crankshaft angles where the second exhaust valve is commanded open, but where the second exhaust valve is stuck closed is indicated by dotted line 312. Intake and exhaust valves are fully closed when intake and exhaust valve lines are not shown. Operation of first and second intake and exhaust valves of the engine's other cylinders are indicated via similar lines.

The second plot from the top of FIG. 3 is a plot of intake and exhaust valve opening and closing events for cylinder number two relative to engine position. The horizontal axis is broken into sections that are labeled "I" for intake stroke, "C" for compression stroke, "P" for power or expansion stroke, and "E" for exhaust stroke. The vertical bars along the horizontal axis represent top-dead-center piston positions and bottom-dead-center piston positions.

The third plot from the top of FIG. 3 is a plot of intake and exhaust valve opening and closing events for cylinder number three relative to engine position. The horizontal axis is broken into sections that are labeled "I" for intake stroke, "C" for compression stroke, "P" for power or expansion stroke, and "E" for exhaust stroke. The vertical bars along the horizontal axis represent TDC piston positions and bottom-dead-center piston positions.

The fourth plot from the top of FIG. 3 is a plot of intake and exhaust valve opening and closing events for cylinder number four relative to engine position. The horizontal axis is broken into sections that are labeled "I" for intake stroke, "C" for compression stroke, "P" for power or expansion stroke, and "E" for exhaust stroke. The vertical bars along the horizontal axis represent TDC piston positions and bottom-dead-center piston positions.

The fifth plot from the top of FIG. 3 is a plot of an exhaust valve stuck state indication versus engine position. The vertical axis represents the state of the exhaust valve stuck state indication and an exhaust valve is indicated to be stuck closed when trace 316 is at a higher level near the vertical axis arrow. Exhaust valves are not indicated to be stuck closed when trace 316 is at a lower level near the horizontal axis. The horizontal axis represents engine position. Trace 316 represents the state of the exhaust valves.

The sixth plot from the top of FIG. 3 is a plot of variable geometry turbocharger (VGT) opening amount versus engine position. The vertical axis represents the VGT opening amount and the VGT opening amount increases in the direction of the vertical axis arrow. The horizontal axis represents engine position. Trace 318 represents the VGT opening amount.

At time t0, the engine is operating and all of the engine's intake valves and exhaust valves are operating as commanded. No exhaust valves are stuck closed and the VGT is open a small amount.

At time t1, the first and second exhaust valves of cylinder number one are commanded open (e.g., via a camshaft applying force to open the valves or via another valve actuating device such as a hydraulic or electric actuator), but the first and second exhaust valves of cylinder number one remain stuck closed. The intake and exhaust valves for the engine's other cylinders continue to operate without sticking according to opening and closing commands. The exhaust valves are not indicated to be sticking. The VGT is partially open.

At time t2, it is determined that exhaust valves of cylinder number one are stuck closed. The exhaust valves may be determined to be stuck closed based on intake manifold pressure, exhaust manifold pressure, engine speed, and/or other engine operating conditions. The VGT vanes are commanded fully closed so that exhaust pressure may be increased. By increasing exhaust pressure, additional opening force may be applied to stuck exhaust valves so that the stuck exhaust valves may be freed.

At time t3, exhaust valve opening timing of cylinders that are adjacent to cylinder number one are advanced. By advancing exhaust valve opening times of cylinders that are adjacent to the cylinder that has exhaust valves that are stuck closed, exhaust manifold pressure may be raised so that pressure exerted on exhaust valves of cylinder number one may be increased, thereby increasing the probability of the exhaust valves of cylinder number one becoming unstuck. The first cylinder having advance exhaust valve opening time is cylinder number three.

At time t4, intake valves of cylinder number one are opened and the opening duration for intake valves of cylinder number one is increased so that air may be evacuated from cylinder number one via the open intake valves. The intake valves of cylinder number one are closed at time t5, which is within a predetermined number of crankshaft degrees of TDC compression stroke of cylinder number one (e.g., within ±10 crankshaft degrees of TDC). Opening the intake valves of cylinder number one at time t4 and closing the intake valves of cylinder number one near TDC compression stroke allows air that is in cylinder number one to be pushed into the intake manifold so that vacuum may develop in cylinder one during the expansion stroke that immediately follows time t5. Vacuum in cylinder number one may increase the pressure differential across the exhaust valves of cylinder number one so that the stuck exhaust valves may be unstuck. Additionally, the exhaust valves of cylinder number one are commanded open within a predetermined number of crankshaft degrees of TDC cylinder number one The intake valves of cylinder numbers two, three, and four continue to operate with their nominal timings (e.g., timings that are based on engine speed and load). The exhaust valves of cylinder numbers two, three, and four continue to operate with advanced exhaust valve timing so as to increase gas pressure to open the stuck exhaust valves of cylinder number one. The exhaust valves of cylinder number one continue to be indicated as stuck closed. The VGT opening amount is small.

At time t6, the exhaust valves of cylinder number one pop open. The exhaust valves may be recognized as popping open via a reduction in intake manifold pressure. Alternatively, valve positions may be sensed via valve position sensors. The exhaust valves of cylinder number one operate as commanded after they pop open at time t6.

At time t7, it is recognized that the exhaust valves of cylinder number one are operating as is expected. Therefore, exhaust valve opening times for cylinder numbers two, three, and four are adjusted back to nominal exhaust valve timings. In addition, boost pressure is reduced and the exhaust valve stuck indication is withdrawn.

In this way, it may be possible to open exhaust valves that are stuck closed. In particular, a pressure differential across the exhaust valves may be increased so that additional force may be applied to open the stuck exhaust valves. Once the exhaust valves are unstuck, valve timing and boost may be returned to nominal values.

Referring now to FIG. 4, a plot showing a prophetic sequence or procedure for freeing an intake poppet valve that is stuck in a closed position is shown. The sequence may be provided via the system of FIG. 1 in cooperation with the method of FIGS. 5-9. The vertical lines at times t10-t15 represent times of interest in the sequence. This sequence is for a four cylinder four stroke engine as shown in FIG. 2B.

The first plot from the top of FIG. 4 is a plot of intake and exhaust valve opening and closing events for cylinder number one relative to engine position. The horizontal axis is broken into sections that are labeled "I" for intake stroke, "C" for compression stroke, "P" for power or expansion stroke, and "E" for exhaust stroke. The vertical bars along the horizontal axis represent TDC piston positions and bottom-dead-center piston positions.

Intake valve open times for a first intake valve of a cylinder are indicated by thin solid line 402. Intake valve open times for a second intake valve of the cylinder are indicated by dashed thin line 404. Intake valves are fully closed when not open. Exhaust valve open times for a first exhaust valve of a cylinder are indicated by thick solid line 406. Exhaust valve open times for a second exhaust valve of the cylinder are indicated by dashed thick line 408. Engine crankshaft angles where the first intake valve is commanded open, but where the first intake valve is stuck closed is indicated by dash-dot line 410. Engine crankshaft angles where the second intake valve is commanded open, but where the second intake valve is stuck closed is indicated by dash-dot-dot line 412. Exhaust valves are fully closed when not open. Intake and exhaust valves are fully closed when intake and exhaust valve lines are not shown. Operation of first and second intake and exhaust valves of the engine's other cylinders are indicated via similar lines.

The second plot from the top of FIG. 4 is a plot of intake and exhaust valve opening and closing events for cylinder number two relative to engine position. The horizontal axis is broken into sections that are labeled "I" for intake stroke, "C" for compression stroke, "P" for power or expansion stroke, and "E" for exhaust stroke. The vertical bars along the horizontal axis represent TDC piston positions and bottom-dead-center piston positions.

The third plot from the top of FIG. 4 is a plot of intake and exhaust valve opening and closing events for cylinder number three relative to engine position. The horizontal axis is broken into sections that are labeled "I" for intake stroke, "C" for compression stroke, "P" for power or expansion stroke, and "E" for exhaust stroke. The vertical bars along the horizontal axis represent TDC piston positions and bottom-dead-center piston positions.

The fourth plot from the top of FIG. 4 is a plot of intake and exhaust valve opening and closing events for cylinder number four relative to engine position. The horizontal axis is broken into sections that are labeled "I" for intake stroke, "C" for compression stroke, "P" for power or expansion stroke, and "E" for exhaust stroke. The vertical bars along the horizontal axis represent TDC piston positions and bottom-dead-center piston positions.

The fifth plot from the top of FIG. 4 is a plot of an intake valve stuck state indication versus engine position. The vertical axis represents the state of the intake valve stuck state indication and an intake valve is indicated to be stuck closed when trace 410 is at a higher level near the vertical axis arrow. Intake valves are not indicated to be stuck closed when trace 410 is at a lower level near the horizontal axis. The horizontal axis represents engine position. Trace 410 represents the state of the intake valves.

The sixth plot from the top of FIG. 4 is a plot of variable geometry turbocharger (VGT) opening amount versus engine position. The vertical axis represents the VGT opening amount and the VGT opening amount increases in the direction of the vertical axis arrow. The horizontal axis represents engine position. Trace 418 represents the VGT opening amount.

At time t10, the engine is operating and all of the engine's intake valves and exhaust valves are operating as commanded. No intake valves are stuck closed. The VGT vanes are partially open.

At time t11, the first and second intake valves of cylinder number one are commanded open (e.g., via a camshaft applying force to open the valves or via another valve actuating device such as a hydraulic or electric actuator), but the first and second intake valves of cylinder number one remain stuck closed. The intake and exhaust valves of the remaining cylinders continue to operate as commanded. The system has not recognized that the intake valves are stuck closed. The VGT opening amount remains unchanged.

At time t12, it is determined that intake valves of cylinder number one are stuck closed. The intake valves may be determined to be stuck closed based on intake manifold pressure, exhaust manifold, pressure, engine speed, and/or other engine operating conditions. The VGT vanes are commanded closed so that boost pressure may be increased. By increasing boost pressure, additional opening force may be applied to stuck intake valves via increasing the pressure differential across the intake valves so that the stuck intake valves may be freed. In addition, exhaust valve closing timing of cylinder number one is adjusted to be within a predetermined number of crankshaft degrees of TDC exhaust stroke of cylinder number one (e.g., within +5 crankshaft degrees of TDC exhaust stroke).

At time t13, exhaust valves of adjacent to cylinder number two are not commanded to open. By leaving exhaust valves of cylinder number two closed, pressure in the intake manifold may be increased further via discharging exhaust to the engine intake manifold so that the force applied to open the stuck intake valves of cylinder number one may be increased. The VGT vanes are close to being fully closed so that boost pressure may continue to increase. The intake valves of cylinder number one are indicated to be stuck.

At time t14, the intake valves of cylinder number one pop open from a stuck state. The exhaust valves of cylinder number two remain in a deactivated fully closed state. The intake and exhaust valves of the other engine cylinders continue to operate as commanded. The intake and exhaust valves of cylinder numbers three and four continue to follow their respective commands. The VGT vanes remain closed and intake valves of cylinder number one are indicated as being stuck closed.

At time t15, the intake valves of cylinder number one are indicated as operating freely. Therefore, the VGT vanes are opened to reduce boost pressure. In addition, the exhaust valves of cylinder number two are commanded to open and close according to nominal engine operating conditions. The intake valves of cylinder number one are no longer indicated as being stuck.

In this way, it may be possible to open intake valves that are stuck closed. In particular, a pressure differential across the intake valves may be increased so that additional force may be applied to open the stuck intake valves. Once the intake valves are unstuck, valve timing and boost may be returned to nominal values.

Referring now to FIGS. 5-9, a high level flow chart of an example method 500 for determining and monitoring a vehicle torque request is shown. The method of FIGS. 5-9 may be incorporated into the system of FIGS. 1-2B as executable instructions stored in controller non-transitory memory. In addition, other portions of method 500 may be performed via a controller transforming operating states of devices and actuators in the physical world. The controller may employ engine actuators of the engine system to adjust engine operation.

At 502, method 500 determined engine operating conditions. The engine operating conditions may include, but are not limited to intake manifold pressure, intake $O_2$ concentration, exhaust air-fuel ratio, engine speed, engine load, and intake and exhaust valve positions. Method 500 may determine these conditions from the sensors and actuators that are described herein. Method 500 proceeds to 504.

At 504, method 500 judges if one or more exhaust valves of an engine cylinder are stuck closed. Method 500 may infer that an exhaust valve is stuck closed based on intake manifold pressure, exhaust manifold pressure, and/or based on states of sensors that directly measure poppet valve positions. If method 500 judges that one or more exhaust valves of an engine cylinder are stuck closed, the answer is yes and method 500 proceeds to 520. Otherwise, the answer is no and method 500 proceeds to 506.

At 506, method 500 judges if one or more exhaust valves of an engine cylinder are stuck open. Method 500 may infer that an exhaust valve is stuck open based on intake manifold pressure, exhaust manifold pressure, and/or based on states of sensors that directly measure poppet valve positions. If method 500 judges that one or more exhaust valves of an engine cylinder are stuck open, the answer is yes and method 500 proceeds to 530. Otherwise, the answer is no and method 500 proceeds to 508.

At 508, method 500 judges if one or more intake valves of an engine cylinder are stuck closed. Method 500 may infer that an intake valve is stuck closed based on intake manifold pressure, exhaust manifold pressure, and/or based on states of sensors that directly measure poppet valve positions. If method 500 judges that one or more intake valves of an engine cylinder are stuck closed, the answer is yes and method 500 proceeds to 550. Otherwise, the answer is no and method 500 proceeds to 510.

At 510, method 500 judges if one or more intake valves of an engine cylinder are stuck open. Method 500 may infer that an exhaust valve is stuck open based on intake manifold pressure, exhaust manifold pressure, and/or based on states of sensors that directly measure poppet valve positions. If method 500 judges that one or more intake valves of an engine cylinder are stuck open, the answer is yes and method 500 proceeds to 560. Otherwise, the answer is no and method 500 proceeds to 512.

At 512, method 500 operates the engine with intake and exhaust valve opening and closing times at baseline timings (e.g., timings that are based on engine speed and load and that are not adjusted based on sticking valves). Method 500 also operates the intake and exhaust valves with baseline lift amounts (e.g., valve lift amounts that are based on engine speed and load and that are not adjusted based on sticking valves). Method 500 proceeds to exit.

At 520, method 500 judges if two exhaust valves of the cylinder having the stuck exhaust valve are stuck closed. If so, the answer is yes and method 500 proceeds to 522. Otherwise, the answer is no and method 500 proceeds to 524.

At 522, method 500 adjusts exhaust valve opening (EVO) timing of one or more cylinders that are adjacent to the cylinder that has the stuck exhaust valve. In particular, method 500 advances EVO timing of adjacent cylinders. Advancing EVO timing of adjacent cylinders may increase pressure in an exhaust manifold that is common to the cylinder having the stuck exhaust valve so that a larger pressure differential develops across the stuck exhaust valve, thereby increasing force to open the stuck closed exhaust valve. An example of advancing EVO timing is shown in FIG. 3. Method 500 proceeds to 524.

At 524, method 500 closes or maintains closed intake and exhaust valves of the cylinder having the stuck closed exhaust valve near TDC power stroke or expansion stroke (e.g., within 5 crankshaft degrees of TDC. Alternatively, method 500 may close or maintain closed intake and exhaust valves of the cylinder having the stuck closed exhaust valve at TDC intake stroke. Thus, method 500 may adjust pressure in the cylinder that has the stuck closed exhaust valve to intake manifold pressure at TDC expansion stroke or intake stroke so that pressure in the cylinder may be reduced further during the later portion of the expansion stroke or intake stroke.

For example, as shown in FIG. 3, intake valves of the cylinder having the stuck closed exhaust valve (e.g., cylinder number one) are closed at TDC compression stroke of cylinder number one so that pressure in cylinder number one is reduced during the expansion stroke. The exhaust valves of cylinder number one are not commanded open at TDC, but the stuck closed exhaust valves may be command open during the expansion stroke as shown in FIG. 3. Alternatively, intake valves of the cylinder having the stuck closed exhaust valve are closed at TDC intake stroke of the cylinder having the stuck exhaust valve. The exhaust valves of the cylinder having the stuck exhaust valve are not commanded open at TDC, but the stuck closed exhaust valves may be command open during the intake stroke. Method 500 proceeds to 526.

At 526, method 500 closes variable geometry turbocharger (VGT) vanes, or alternatively, a waste gate position, to a closed position to increase exhaust pressure. By increasing exhaust pressure, additional force may be applied to open the stuck exhaust valves. In other words, the increased exhaust pressure may increase a differential pressure across the stuck exhaust valves to increase the opening force on the stuck exhaust valves. Further, method 500 may fully close or partially close the EGR valve to increase exhaust pressure. Method 500 proceeds to 528.

At 528, method 500 commands the stuck exhaust valves to be open after TDC compression stroke or after TDC intake stroke. Further, the stuck exhaust valves may be commanded open near bottom-dead-center (BDC) expansion stroke or intake stroke so that the cams or other actuators may further apply force to open the stuck exhaust valves.

In addition, method 500 may return exhaust valve timing and lift for engine intake and exhaust valves to their baseline timings (e.g., timings that are not adjusted for sticking valves) if the stuck exhaust opens and begins to operate freely. Method 500 proceeds to exit.

At 530, method 500 judges if two exhaust valves of the cylinder having the stuck exhaust valve are stuck open. If so, the answer is yes and method 500 proceeds to 540. Otherwise, the answer is no and method 500 proceeds to 532.

At 540, method 500 adjusts exhaust valve opening (EVO) timing of one or more cylinders that are adjacent to the cylinder that has the stuck exhaust valve. In particular, method 500 advances EVO timing of adjacent cylinders. Advancing EVO timing of adjacent cylinders may increase pressure in an exhaust manifold that is common to the cylinder having the stuck exhaust valve so that a larger pressure differential develops across the stuck exhaust valve, thereby increasing force to further open the stuck open exhaust valve. Method 500 proceeds to 542.

At 542, method 500 closes variable geometry turbocharger (VGT) vanes, or alternatively, a waste gate position, to a closed position to increase exhaust pressure. By increasing exhaust pressure, additional force may be applied to further open the stuck open exhaust valves. In other words, the increased exhaust pressure may increase a differential pressure across the stuck exhaust valves to increase the opening force on the stuck exhaust valves. Further, method 500 may fully close or partially close the EGR valve to increase exhaust pressure. Method 500 proceeds to exit.

At 532, method 500 operates intake valves of the cylinder having the stuck open exhaust valve at baseline or nominal timings (e.g., timings that have not been adjusted based on exhaust valves that are stuck open). Further, intake and exhaust valves of other cylinders are operated at their respective baseline timings. Method 500 proceeds to 534.

At 534, method 500 may advance fuel injection timing and/or spark timing to advance ignition timing (e.g., a crankshaft angle where combustion of air and fuel in the cylinder begins during a cylinder cycle) in the cylinder that has the stuck open exhaust valve. By advancing ignition timing in the cylinder having the stuck open exhaust valve, pressure in the cylinder having the stuck open exhaust valve may be increased to assist closing the stuck open exhaust valve. Method 500 proceeds to 536.

At 536, method 500 commands closed the exhaust valve that is not stuck in the cylinder that has the stuck exhaust valve. The exhaust valve is kept closed to constrict flow out of the cylinder so that additional force may be applied to the stuck exhaust valve via pressure in the cylinder having the stuck open exhaust valve. Method 500 proceeds to exit.

In addition, method 500 may return exhaust valve timing and lift for engine intake and exhaust valves to their baseline timings (e.g., timings that are not adjusted for sticking valves) if the stuck exhaust opens and begins to operate freely. Method 500 proceeds to exit.

At 550, method 500 judges if two intake valves of the cylinder having the stuck intake valve are stuck closed. If so, the answer is yes and method 500 proceeds to 552. Otherwise, the answer is no and method 500 proceeds to 554.

At 552, method 500 holds closed exhaust valves of one or more adjacent cylinder to the cylinder that has the stuck closed intake valve. For example, as shown in FIG. 4, when intake valves of cylinder number one are stuck closed, the exhaust valves of cylinder number two may be held closed for an entire cycle of cylinder number two (e.g., four strokes) so that exhaust from cylinder number two may be ejected into the engine intake manifold, thereby increasing pressure in the intake manifold and the pressure differential that is across the stuck intake valves. In this way, additional force may be applied to open the stuck closed intake valves. Method 500 proceeds to 554.

At 554, method 500 closes or maintains closed intake and exhaust valves of the cylinder having the stuck closed intake valve near TDC power stroke or expansion stroke (e.g., within 5 crankshaft degrees of TDC. Alternatively, method 500 may close or maintain closed intake and exhaust valves of the cylinder having the stuck closed intake valve at TDC intake stroke. Thus, method 500 may adjust pressure in the cylinder that has the stuck closed intake valve to intake manifold pressure at TDC expansion stroke or intake stroke so that pressure in the cylinder may be reduced further during the later portion of the expansion stroke or intake stroke.

For example, exhaust valves of the cylinder having the stuck closed intake valve (e.g., cylinder number one) are closed at TDC compression stroke of cylinder number one so that pressure in cylinder number one is reduced during the expansion stroke. The intake valves of cylinder number one are not commanded open at TDC, but the stuck closed intake valves may be command open late during the expansion stroke. Alternatively, exhaust valves of the cylinder having the stuck closed intake valve are closed at TDC intake stroke of the cylinder having the stuck intake valve. The exhaust valves of the cylinder having the stuck intake valve are not commanded open at TDC, but the stuck closed intake valves may be command open late during the intake stroke. Method 500 proceeds to 556.

At 556, method 500 closes variable geometry turbocharger (VGT) vanes, or alternatively, a waste gate position, to a closed position to increase exhaust pressure. By increasing exhaust pressure, additional force may be applied to open the stuck exhaust valves. In other words, the increased exhaust pressure may increase a differential pressure across the stuck exhaust valves to increase the opening force on the stuck exhaust valves. Further, method 500 may fully close or partially close the EGR valve to increase exhaust pressure. Further still, method 500 may partially or fully open the engine intake throttle to increase boost pressure in the engine intake manifold to increase the pressure differential across the intake valves. Method 500 proceeds to 558.

At 558, method 500 commands the stuck intake valves to be open after TDC compression stroke or after TDC intake stroke. Further, the stuck intake valves may be commanded open near bottom-dead-center (BDC) expansion stroke or intake stroke so that the cams or other actuators may further apply force to open the stuck exhaust valves.

In addition, method 500 may return exhaust valve timing and lift for engine intake and exhaust valves to their baseline timings (e.g., timings that are not adjusted for sticking valves) if the stuck exhaust opens and begins to operate freely. Method 500 proceeds to exit.

At 560, method 500 judges if two intake valves of the cylinder having stuck intake valves are stuck open. If so, the answer is yes and method 500 proceeds to 570. Otherwise, the answer is no and method 500 proceeds to 562.

At 562, method 500 holds closed exhaust valves of the cylinder that has the stuck open intake valves. The exhaust valves are held closed so that pressure in the cylinder having the stuck open intake valves increases to apply force to close the stuck open intake valves from inside of the cylinder. In particular, pressure from combustion in the cylinder may exert force on the stuck open intake valves so that the stuck open intake valves may be closed. Method 500 proceeds to 564.

At 564, method 500 injects fuel to and combusts air and fuel in the cylinder that has the stuck open intake valves and held closed exhaust valves. The pressure from combustion within the cylinder may help to close the stuck open intake valves. The amount of fuel may be increased to increase pressure in the cylinder and the ignition timing of the cylinder may be advanced via advancing fuel injection timing for a diesel engine or advancing spark timing for a gasoline engine. Method 500 proceeds to exit.

At 570, method 500 holds closed exhaust valves of one or more adjacent cylinder to the cylinder that has the stuck closed intake valve. For example, when intake valves of cylinder number one are stuck open, the exhaust valves of cylinder number two may be held closed for an entire cycle of cylinder number two (e.g., four strokes) so that exhaust from cylinder number two may be ejected into the engine intake manifold, thereby increasing pressure in the intake manifold and the pressure differential that is across the stuck intake valves. In this way, additional force may be applied to further open the stuck open intake valves. Method 500 proceeds to exit.

In this way, pressure differentials may be purposefully generated across intake or exhaust valves to facilitate movement of stuck intake or exhaust valves. In addition, cylinders other than the cylinder with the stuck valves may be enlisted to help facilitate valve movement.

Thus, the method of FIGS. 5-9 provides for an engine operating method, comprising: fully closing one or more valves of a cylinder of an engine within a predetermined crankshaft angle of a piston of the cylinder being at a top-dead-center compression stroke position such that all valves of the cylinder are closed in response to one or more exhaust valves of the cylinder being stuck closed; and commanding the one or more exhaust valves of the cylinder that are stuck closed to open when the piston is within a predetermined crankshaft angle of the top-dead-center compression stroke position. The method further comprises increasing boost to the engine in response to the one or more exhaust valves of the cylinder being stuck closed. The method includes where the boost is increased via adjusting a position of a waste gate. The method further includes where the boost is increased via adjusting a position of a vane. The method further comprises advancing exhaust valve opening timing of one or more cylinders of the engine that are adjacent to the cylinder in response to the one or more exhaust valves of the cylinder being stuck closed. The method includes where the one or more cylinders of the engine share a common exhaust manifold with the cylinder. The method further comprises fully closing one or more valves of a cylinder of an engine within a predetermined crankshaft angle of a piston of the cylinder being at a top-dead-center compression stroke position such that all valves of the cylinder are closed in response to one or more intake valves of the cylinder being stuck closed; commanding the one or more intake valves of the cylinder that are stuck closed to open when the piston is within a predetermined crankshaft angle of the top-dead-center intake stroke position of the cylinder; and increasing boost pressure in response to the one or more intake valves of the cylinder being stuck via closing vanes of a turbocharger, closing an exhaust gas recirculation valve, and increasing an opening amount of an intake throttle. The method further comprises closing an exhaust gas recirculation valve in response to the one or more exhaust valves of the cylinder being stuck closed The method of FIGS. 5-9 also provides for an engine operating method, comprising: holding closed two exhaust valves of a cylinder of an engine fully closed during an exhaust stroke of the cylinder in response to one or more intake valves of the cylinder being stuck open. The method further comprises advancing fuel injection timing for the cylinder in response to the one or more intake valves of the cylinder being stuck open. The method further comprises advancing spark timing for the cylinder in response to the one or more intake valves of the cylinder being stuck open. The method further comprises at least partially closing an exhaust gas recirculation valve in response to the one or more intake valves of the cylinder being stuck open. The method further comprises holding exhaust valves of the cylinder closed for an entire cycle of the cylinder, advancing ignition timing of the cylinder, and increasing an amount of fuel injected to the cylinder in response to one or more intake valves of the cylinder being stuck open. The method includes where the two exhaust valves are held closed during an entire duration of the exhaust stroke. The method further comprises closing exhaust valves of one or more cylinders that are adjacent to the cylinder for at least an entire engine cycle when two of the intake valves of the cylinder are stuck open or closed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
    fully closing one or more valves of a cylinder of an engine within a predetermined crankshaft angle of a piston of the cylinder being at a top-dead-center compression stroke position such that all valves of the cylinder are closed in response to one or more exhaust valves of the cylinder being stuck closed; and
    commanding the one or more exhaust valves of the cylinder that are stuck closed to open when the piston is within a predetermined crankshaft angle of the top-dead-center compression stroke position.

2. The method of claim 1, further comprising increasing boost to the engine in response to the one or more exhaust valves of the cylinder being stuck closed.

3. The method of claim 2, where the boost is increased via adjusting a position of a waste gate.

4. The method of claim 2, where the boost is increased via adjusting a position of a vane.

5. The method of claim 1, further comprising advancing exhaust valve opening timing of one or more cylinders of the engine that are adjacent to the cylinder in response to the one or more exhaust valves of the cylinder being stuck closed.

6. The method of claim 1, further comprising:
    fully closing one or more valves of a cylinder of an engine within a predetermined crankshaft angle of a piston of the cylinder being at a top-dead-center intake stroke position such that all valves of the cylinder are closed in response to one or more intake valves of the cylinder being stuck closed;

commanding the one or more intake valves of the cylinder that are stuck closed to open when the piston is within a predetermined crankshaft angle of the top-dead-center intake stroke position of the cylinder; and increasing boost pressure in response to the one or more intake valves of the cylinder being stuck via closing vanes of a turbocharger, closing an exhaust gas recirculation valve, and increasing an opening amount of an intake throttle.

7. The method of claim 1, further comprising closing an exhaust gas recirculation valve in response to the one or more exhaust valves of the cylinder being stuck closed.

8. A vehicle system, comprising:
an engine including adjustable timing intake and exhaust valves; and
a controller including executable instructions stored in non-transitory memory that cause the controller to hold a first exhaust valve of a cylinder closed during an exhaust stroke of the cylinder in response to a second exhaust valve of the cylinder being stuck in an open position.

9. The system of claim 8, further comprising additional instructions to advance fuel injection timing of the cylinder in response to the second exhaust valve of the cylinder being stuck in the open position.

10. The system of claim 8, further comprising additional instructions to advance spark timing of the cylinder in response to the second exhaust valve of the cylinder being stuck in the open position.

11. The system of claim 8, further comprising additional instructions to richen an air-fuel ratio of the cylinder in response to the second exhaust valve of the cylinder being stuck in the open position.

12. The system of claim 8, further comprising additional instructions to advance exhaust valve opening timing of one or more cylinders of the engine that are adjacent to the cylinder in response to two exhaust valves of the cylinder being stuck open.

13. The system of claim 12, further comprising additional instructions to close vanes of a turbocharger in response to the second exhaust valve of the cylinder being stuck in the open position.

14. The system of claim 12, further comprising additional instructions to close a waste gate of a turbocharger in response to the second exhaust valve of the cylinder being stuck in the open position.

15. An engine operating method, comprising:
holding closed two exhaust valves of a cylinder of an engine fully closed during an exhaust stroke of the cylinder in response to one or more intake valves of the cylinder being stuck open.

16. The method of claim 15, further comprising advancing fuel injection timing for the cylinder in response to the one or more intake valves of the cylinder being stuck open.

17. The method of claim 15, further comprising advancing spark timing for the cylinder in response to the one or more intake valves of the cylinder being stuck open.

18. The method of claim 17, further comprising at least partially closing an exhaust gas recirculation valve in response to the one or more intake valves of the cylinder being stuck open.

19. The method of claim 15, further comprising closing exhaust valves of one or more cylinders that are adjacent to the cylinder for at least an entire engine cycle when two of the one or more intake valves of the cylinder are stuck open or closed.

20. The method of claim 15, where the two exhaust valves are held closed during an entire duration of the exhaust stroke.

* * * * *